United States Patent [19]
Carson, Jr. et al.

[11] 3,756,546
[45] Sept. 4, 1973

[54] AIRCREW ESCAPE SYSTEM

[75] Inventors: Ralph C. Carson, Jr., Langhorne; James A. Lyons, Jr., Philadelphia, both of Pa.

[73] Assignee: The United States of America as represented by the Secretary of the Navy, Washington, D.C.

[22] Filed: Nov. 23, 1971

[21] Appl. No.: 201,330

[52] U.S. Cl. .............................. 244/138 R, 244/140
[51] Int. Cl. ............................................ B64d 25/12
[58] Field of Search .................... 244/138, 140, 141, 244/152, 122 R, 122 A, 122 AC, 122 AB, 122 AD, 122 AE, 118, 137, 1 R, 16

[56] References Cited
UNITED STATES PATENTS

| | | | |
|---|---|---|---|
| 3,679,157 | 7/1972 | Roberts | 244/16 |
| 3,377,037 | 4/1968 | Stewart | 244/140 X |
| 3,289,976 | 12/1966 | Lemoigne | 244/16 |
| 2,985,413 | 5/1961 | Widmanstetter | 244/140 |
| 2,751,171 | 6/1956 | Martin | 244/122 R X |
| 3,459,099 | 8/1969 | Litz, Jr. et al | 244/122 R X |

FOREIGN PATENTS OR APPLICATIONS

| | | | |
|---|---|---|---|
| 1,377,868 | 9/1964 | France | 244/138 R |

*Primary Examiner*—Milton Buchler
*Assistant Examiner*—Carl A. Rutledge
*Attorney*—R. S. Sciascia and Henry Hansen

[57] ABSTRACT

An aircrew escape system comprising a capsule adapted to contain a crewmember, having attached thereto a deployable parawing controllable by the crewmember, and a deployable tractor rocket connected to the top of the capsule by a length of tow rope. Contained within the capsule is a control unit by which the crewmember, once in position, initiates the burn of the tractor rocket, initiating separation of the capsule from the aircraft and through which the crewmember can control the jettisoning of the tractor rocket and the ignition of an air-breathing powerplant mounted on the capsule. The parawing, in its deployed state, is aligned at an angle of attack relative the longitudinal axis of the capsule by preselected lengths of supporting shrouds having control shrouds attached to the trailing edge thereof terminating at a control stick in the capsule. Accordingly, when the capsule is accelerated by the tractor rocket to a velocity where the lift force of the parawing substantially balances the weight of the capsule the tractor rocket is released, the powerplant is started and the capsule is in position for controlled horizontal flight.

9 Claims, 5 Drawing Figures

PATENTED SEP 4 1973 3,756,546

AIRCREW ESCAPE SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to aircraft escape systems, and more particularly to self-powered escape systems capable of sustained horizontal flight.

Generally the typical aircrew escape systems used in the past were designed to primarily control the descent velocity of the crewmember after ejection from a crippled aircraft, and were not directed at providing the crewmember with any significant lateral flight capability. Such escape systems committed the crewmember to a landing area immediately below the site of emergency of the parent aircraft and particularly in military applications such landing areas often were either controlled by hostile forces or presented adverse environmental conditions. Accordingly, in order to allow the crewmember some option of selecting the descent location there have been devised in the prior art escape systems capable of sustained horizontal flight. These were generally either powered or unpowered rotary or fixed wing configurations, where the required wing or disc areas necessary to support a crewmember together with the sustaining systems were large and therefore collapsible to fit the confines of the crew compartment, requiring bulky deployment structures. Furthermore, the deployment of these collapsible aerodynamic surfaces necessarily occurred at relatively high speeds, consequently the orientation and stability of the configuration during deployment was critical, as well as the deployment sequence thereof. This lack of stability necesssitated extensive stabilization apparatus used only during deployment. Also such prior art escape systems were often not inherently stable in any preferred orientation during and after deployment requiring extensive control corrections by the crewmember to bring the escape system to a horizontal alignment.

SUMMARY OF THE INVENTION

Accordingly, it is the general purpose and object of the present invention to provide an aircrew escape system which is inherently stable during ejection and deployment and which automatically assumes a horizontal orientation after deployment without additional control corrections. Other objects of the invention are to provide a relatively simple escape system having few parts which are conveniently collapsible to fit the confines of the crew compartment.

Briefly, these and other objects of the present invention are accomplished by providing an escape capsule adapted to contain a crewmember having attached thereto a deployable tractor rocket which by a tow cable extracts the capsule out of the crew compartment. The capsule is attached to the aircraft by attachment devices such as explosive bolts which are released or fired simultaneously with the ignition of the tractor rocket. Attached by shrouds to the dorsal side of the capsule is a collapsible parawing which, after ejection, is deployed at an angle of attack determined by the respective length of the shrouds corresponding to the angle of attack necessary to lift the weight of the capsule in horizontal flight at a predetermined speed. Mounted on the capsule is an air-breathing powerplant, such as a small turbojet, which is started by the crewmember concurrent with the release of the tractor rocket providing the propulsive force to overcome the drag during horizontal flight. Typically the capsule is stored in an upright position and is towed generally vertically away from the parent aircraft by the tractor rocket. As the capsule is accelerated vertically away from the aircraft the deployed parawing generates lift forces normal to the flight path accelerating the capsule laterally until the capsule reaches an attitude where the lift force is balanced by a component of the weight in the opposite direction. In theis attitude the capsule generates forces which together with the weight rotate the tractor rocket to a new attitude, substantally aligned with the capsule, and the system is accelerated along the new attitude to higher velocities which in turn generate more lift and the process is continued rotating the system through a transition to a horizontal attitude. The tractor rocket is configured to contain sufficient propellant to accelerate the escape system through above transition to a horizontal velocity substantially equal to the design speed of the capsule at which time the rocket is released and the turbojet is started. In this configuration the crewmember is free to steer the capsule, through trailing edge control shrouds, to a desired landing site and upon reaching the site the crewmember abandons the capsule and descends to ground on a conventional service parachute.

DESCRIPTION OF THE PREFERRED EMBODIMENT

Figure 1:
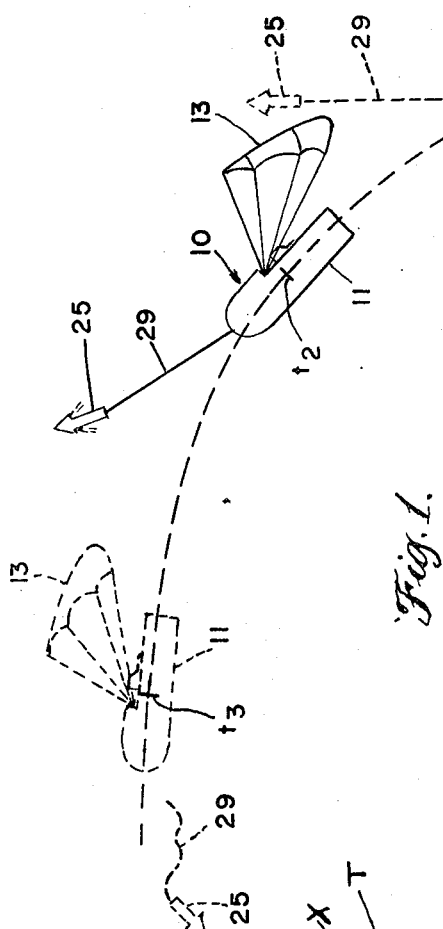
FIG. 1 is a time sequence diagram of the ejection and deployment of an aircrew escape system constructed according to the present invention.

As shown in FIG. 1, an aircrew escape system 10 comprising a cylindrical capsule 11 is initially stored in an upright position behind a seat assembly 12 in a parent aircraft 15 when not in use. Upon the occurrence of an emergency, or at time $t_0$ of the sequence of events illustrated in FIG. 1, a canopy 16 of the disabled aircraft 15 is jettisoned clearing the way for ejection of the escape system 10.

Figure 2:
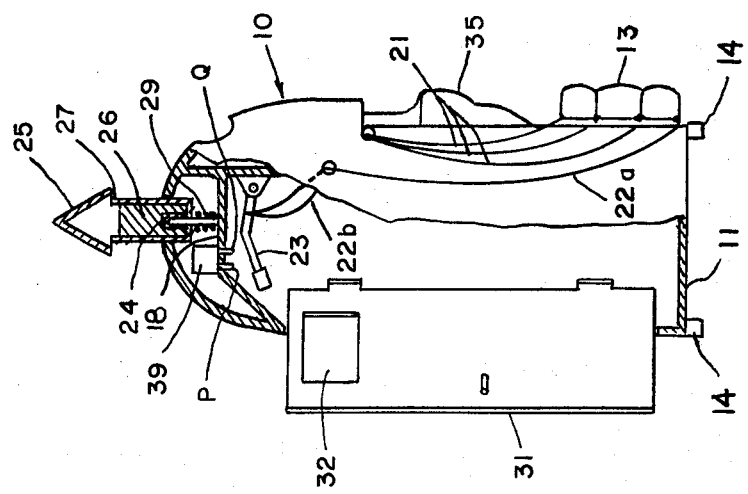
FIG. 2 is a side view in partial cross section of the invention escape system at time $t_0$ of FIG. 1.

As shown in more detail in FIG. 2 escape system 10 is in its stored configuration at time $t_0$ immediately prior to ejection. The cylindrical capsule 11 is attached to the floor of the parent aircraft by explosive bolts 14 in a vertical or upright position, forming a protective housing faired at the forward end and closed at the aft end. Collapsed and stored for deployment on the lower dorsal side of capsule 11 is a parawing 13 attached to the capsule by shrouds 21 at a point dorsally and proximately the center of gravity of capsule 11 when occupied. Also connected to the aft end of parawing 13 are left and right trailing edge control shroud 22a and 22b, respectively, passing through corresponding openings to the inside of capsule 11 to attach at the free ends to a control stick 23 which is pivotally attached at one end to the capsule. Stored in the upper end of capsule 11, in an opening in the forward fairing, is a tractor rocket 25. Tractor rocket 25 comprises a rocket casing 27 filled with a predetermined amount of solid propellant 26 for producing a total impulse as described hereinbelow. Proximate the forward end casing 27 forms a plurality of circular nozzles disposed around the circumference thereof generally aligned to exhaust in a downward direction, and on the aft end casing 27 is formed to mate with a mounting post 24 affixed within the forward fairing of capsule 11 to an instrument bulkhead 18. In its stored configuration a tow rope 29, attached at one end to the aft end of rocket 25, is coiled around the post 24, attaching at the other end to the post, and the tractor rocket 25 is placed on top of the coils such that when propellant 26 is ignited the tractor rocket 25 will separate from capsule 11 extending tow rope 29. Partly buried in the dorsal surface of capsule 11 is a conventional air-breathing powerplant or turbojet 35 having an inlet duct 37 opening at the forward fairing, and exhausting the gases through to the aft end of the capsule. Also mounted on bulkhead 18 is a control unit 39 having control switch buttons Q and P where control button Q is connected to ignite by conventional means (not shown) simultaneously both the propellant 26 in rocket 25 and the explosive bolts 14, releasing the capsule for withdrawal by rocket 25. Control button P is connected by conventional means (also not shown) to start turbojet 35 and simultaneously to release tow rope 29 from post 24. Accordingly, upon experiencing an abort emergency the crewmember enters capsule 11 through a doorway in the ventral side thereof closed by a door 31 including a window 32, and once in position ignites rocket 25 and severs explosive bolts 14 by depressing button Q.

At time $t_1$ of FIG. 1 capsule 11 is extracted by the tractor rocket 25 from the crew compartment of the aircraft. After extraction, at a time interval determined by conventional timing means in control unit 39 (not shown), the collapsed parawing 13 is released by any conventional releasing means and begins to unfurl.

Figure 3:
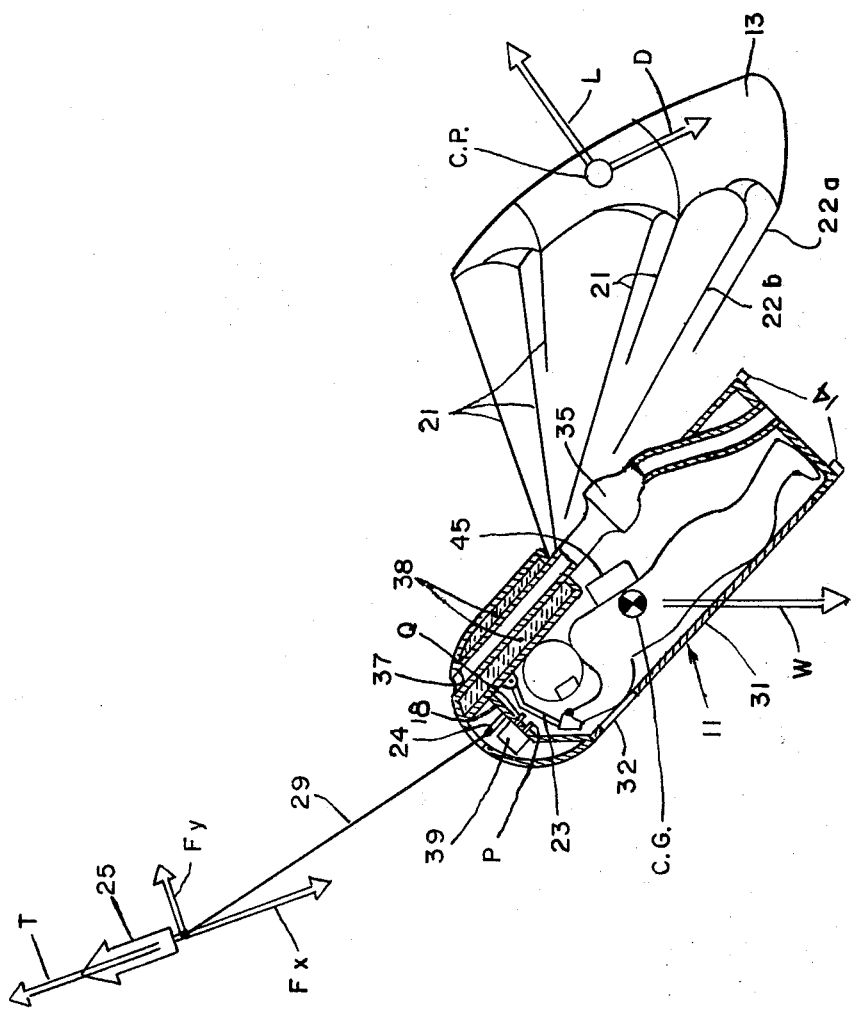
FIG. 3 is a side view in partial cross section of the escape system at time $t_2$ of FIG. 1.

At time $t_2$ of FIG. 1 the aircrew escape system 10 is shown in a transition to horizontal state with the parawing 13 fully developed and the tractor rocket 25 maintaining thrust. As shown in more detail in FIG. 3 the parawing 13 is deployed at an angle of attack relative the longitudinal axis of capsule 11, the angle of attack being determined by the respective lengths of shrouds 21 for producing a lift force at cruise or design speed further described hereinbelow. In this attitude, parawing 13 produces an effective lift force vector L and a drag force vector D acting at a center of pressure C.P. of the parawing. Opposing those forces is the weight vector W originating at the center of gravity CG of the capsule 11 and the thrust vector T of the tractor rocket 25. The combination of the lift vector L, the drag vector D and the weight vector W resolves on the cable 29 into forces $F_x$ and $F_y$, as further described hereinbelow, corresponding to the total forces on the tractor rocket 25, respectively along and normal to the longitudinal axis thereof. Formed proximately the forward end and in the dorsal side of capsule 11 is a fuel tank 38 containing a conventional fuel for a turbojet. Extending through the tank substantially parallel to the longitudinal axis is an inlet duct 37 opening through the forward fairing and connecting at the aft end to a turbojet 35. The output or the exhaust of turbojet 35 is directed by an exhaust duct 36 to the aft end of capsule 11. Thus an air-breathing powerplant is formed in capsule 11 allowing for sustained powered flight once the burn capability of the tractor rocket 25 is exhausted, where the powerplant is fed by the propellant contained in tank 38 by conventional propellant feed arrangements not shown. It is contemplated that in most applications the turbojet 35 is off until such time as the rocket 25 is approaching exhaustion. At such time the crewmember presses control button P on a control unit 39 which simultaneously starts the turbojet 35 and releases tow rope 29. The attitude of the escape system 10 at exhaustion of rocket 25 corresponds to the time $t_3$ attitude of FIG. 1 comprising a self-powered configuration aligned substantially along the local horizontal, controllable by the deflections of stick 23 which in turn deflects the respective trailing edges of parawing 13 by control shrouds 22a and 22b. In this configuration the crewmember is free to select a desirable landing location, by viewing through window 32, and upon reaching such location abandons the capsule through door 31 and descends with the aid of a service parachute 45 to ground.

Figure 4:
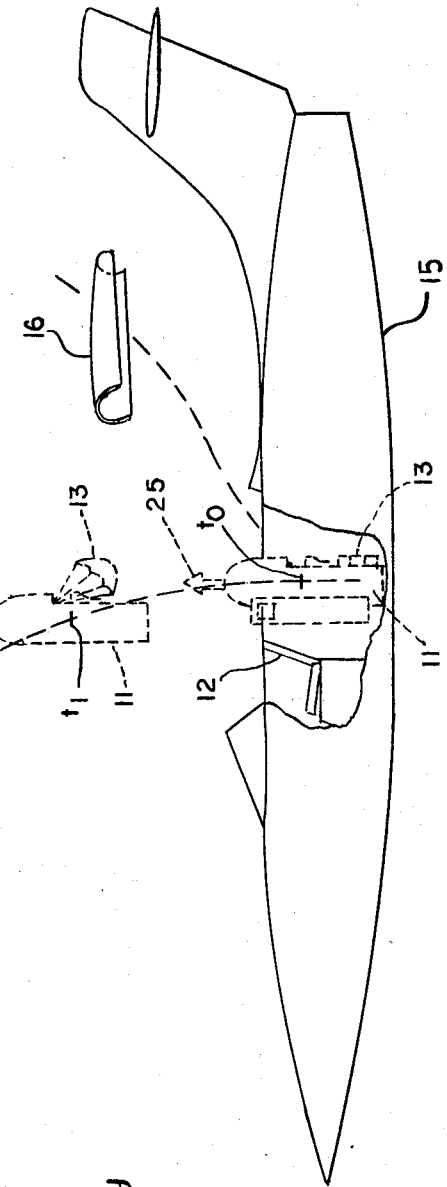
FIG. 4 is a vector diagram of the forces acting on a tractor rocket according to the present invention at time $t_2$ of FIG. 1.
Figure 4:
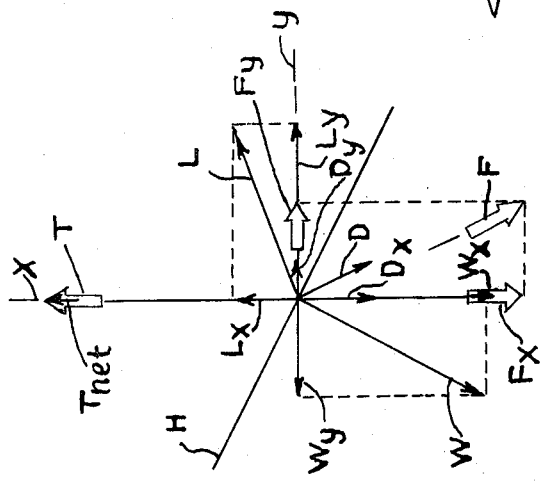

The operation of the present invention will now be described with reference to FIGS. 4 and 5. Once in position in capsule 11 the crewmember presses button Q on control unit 39 which simultaneously triggers the explosive bolts 14 retaining the capsule to the aircraft, and ignites the propellant 26 in the tractor rocket 25. Tractor rocket 25 is propelled away from the capsule 11 uncoiling the coiled tow rope 29 until the rope is stretched out. The capsule 11 is then extracted from the aircraft and at a preselected time after extraction, as provided in control unit 39 by any conventional means, the parawing 13 is released from its stowed position for deployment and the escape system 10 then assumes the configuration corresponding to time $t_1$ of FIG. 1. As the capsule is accelerated by the tractor rocket the deployed parawing 13 fills with air and generates a lift and drag force transmitted to the capsule by shrouds 21. As described below the lift and drag force vectors L and D are formed by the combination of the angle of attack of the parawing 13 relative the flight path and the velocity of the escape system 10.

In the initial attitude, corresponding to time $t_1$ of FIG. 1 the accumulated velocity of the capsule is generally vertical and the tractor rocket is essentially opposing the weight of the capsule. As the capsule is accelerated to substantial aerodynamic pressures, the lift force L component of the parawing 13 begins to accelerate the capsule laterally and through the tow rope 29 beings to rotate the tractor rocket 25. Specifically, referring to FIG. 4 the summation of forces along and normal to the longitudinal axis of rocket 25, at any attitude relative the local horizintal H during transition as exemplified by the attitude at time $t_2$ of FIG. 1, is equal to the vector sum of force vectors T, L, D and W resolved on longitudinal and normal axes $x$ and $y$ of the rocket 25. Typically vector T is aligned with the $x$ or longitudinal axis of rocket 25 corresponding to the thrust thereof, where vectors L, D and W have components both along axes $x$ and $y$. It is to be noted that in order to fully describe the dynamics of transition a three axis system is necessary; however, this example illustrates the case where all of the forces and moments align in one plane being readily expanded by techniques known in the art to a more general case. Summing along the $x$ axis $$T = D_x - L + W_x + M\ddot{x} \quad (1)$$

where $M$ is the mass of system 10 and $\ddot{x}$ is the acceleration along the $x$ axis, and along the $y$ axis $$K = D_y + L_y - W_y + M\ddot{y} \quad (2)$$

where $\ddot{y}$ is the lateral acceleration of system 10 along the $y$ axis. $K$ is therefore the unbalanced moment on the aft end of rocket 25. Stated in terms of resulting force components $F_x$ and $F_y$ $$T = F_x + M\ddot{x} \quad (3)$$

and $$K = F_y + M\ddot{y} \quad (4)$$

Expressing $K$ in terms of the moment of inertia $I$ of rocket 25

$$\ddot{\theta} = K/I \quad (5)$$

the angular acceleration of rocket 25 is established in a linearized form. Accordingly, as the speed of assembly 10 increases the tractor rocket is continuously turned until the capsule 11 is substantially aligned for horizontal flight.

Figure 5:
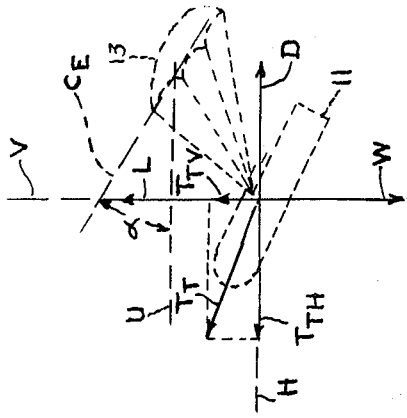
FIG. 5 is a vector diagram of the forces acting on a capsule according to the present invention at time $t_3$ of FIG. 1.

As shown in FIG. 5 the conditions necessary to maintain horizontal flight require that the force vector sum in a vertical direction V and a horizontal direction H are both equal to zero. Specifically after the release of tractor rocket 25 or at time $t_3$ of FIG. 1, the vector sum of turbojet 35, thrust $T_T$, the drag force D, the lift force L and the weight W have to cancel. Accordingly resolving along the horizontal H and vertical V directions the respective sums are as follows:

$$T_{TH} - D + 0 \quad (6)$$

$$T_{TV} + L - W = 0 \quad (7)$$

where $T_{TH}$ and $T_{TV}$ are the horizontal and vertical components of the turbojet thrust $T_T$. Furthermore the drag force D and the lift force L can be expressed as $$D = C_{D_\alpha}(\alpha)(\rho U^2/2)(S) \quad (8)$$

and $$L = C_{L_\alpha}(\alpha)(\rho U^2/)(S) \quad (9)$$

where $C_{D_\alpha}$ and $C_{L_\alpha}$ are the drag and lift coefficients of the parawing with respect to an angle of attack $\alpha$, $\rho$ is the atmospheric density, $S$ is the reference area of the parawing and $U$ is the horizontal flight velocity. Thus for any selected combination of $W$, $T_T$ and $U$ there is a particular angle of attack $\alpha$ which is determined by the respective lengths of shrouds 21. In order to minimize any starting transients in the horizontal mode it is further contemplated that the total impulse of propellant 26 is sufficient to bring the capsule 11 to a horizontal velocity $U$ which will satisfy the conditions of equations 6, 7, 8 and 9.

In this configuration the crewmember is free to select both the direction and the duration of the horizontal flight in his search for a suitable landing location. Upon arriving over a suitable landing location, the crewmember opens door 31, falls free of the capsule and descends to the ground on service parachute 45.

Some of the many advantages of the present invention should now be readily apparent. In particular, the present invention provides an escape system which allows a relatively large degree of flexibility as to where the crewmember has to descend while at the same time maintaining the inherent automatic self-actuating features which are commonly desired in typical aircraft ejection systems. Furthermore, the escape system forms a surrounding shield around the crewmember against possible hazards of the enironment or ground fire.

Obviously many modifications and variations of the present invention are possible in view of the atove teachings. It is therefore to be understood that within the scope of the appended claims the invention may be practiced otherwise than as specifically described.

What is claimed is: 1. An aircrew escape system for separating and transporting a crewmember away from a disabled aircraft comprising, in combination:

glider means formed to be releasably secured to the aircraft and to receive the crewmember for deploying and producing a velocity-responsive dorsal lifting force, said glider means including thrust producing means attached to align along the longitudinal axis thereof for selectively producing an aftward thrust force; and force producing means releasably connected to the forward end of said glider means for accelerating said glider means from the aircraft.

2. An aircrew escape system according to claim 1, further comprising: said glider means including control means operatively connected to release said force producing means and to start said thrust producing means.

3. An aircrew escape system according to claim 2, further comprising:

said glider means including a cylindrical housing faired at the forward end and closed at the aft end, a doorway formed in said housing for receiving the crewmember and a window formed in the ventral side of the housing for viewing therethrough.

4. An aircrew escape system according to claim 3, further comprising:

said glider means including deployable wing means operatively connected to said housing for deploying and forming a lifting surface proximate the dorsal side thereof.

5. An aircrew escape system according to claim 4, further comprising:

said control means including a control unit mounted in said capsule, switch means mounted on said control unit for producing a control signal connected to release said force producing means and start said thrust producing means.

6. An aircrew escape system according to claim 5, further comprising:

said force producing means including a cylindrical rocket casing, a plurality of exhaust nozzles disposed around the periphery and proximate the upper end of said casing aligned to exhaust towards the aft end thereof, solid propellant contained within the said casing and a tow rope connected at one end thereof to the aft end of said casing and at the other end thereof releasably connected to the forward end of said housing.

7. An aircrew escape system according to claim 6, further comprising:

said wing means including a parawing collapsible for storage along the dorsal side of said housing, support shroud means connected at one end thereof to the peripheral edges of said parawing and at the other end to said housing proximate the upper dorsal side thereof, a control stick pivotally mounted in said housing and trailing edge control shrouds connected respectively to the left and right hand ends of the trailing edge of said parawing and at the other end to said control stick.

8. An aircrew escape system according to claim 7, further comprising:

said support shroud means including a plurality of shrouds of preselected lengths arranged to attach the leading edge of said parawing a distance greater from the longitudinal axis of said housing than the corresponding distance of the trailing edge thereof.

9. An aircrew escape system according to claim 8, further comprising:

said thrust producing means including a turbojet operatively connected to start upon receiving said control signal and operatively connected to said propellant tank and to the dorsal side of said capsule, an intake duct open at one end and aligned to receive ram air connected at the other end to the input side of said turbojet and an exhaust duct connected at one end to the output side of said turbojet and opening at the other end at the aft end of said housing.

* * * * *